(12) United States Patent
Miura

(10) Patent No.: US 10,272,500 B2
(45) Date of Patent: Apr. 30, 2019

(54) CHUCK DEVICE

(71) Applicant: Hitachi Automotive Systems, Ltd., Ibaraki (JP)

(72) Inventor: Ken Miura, Fukushima (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/561,665

(22) PCT Filed: Jun. 23, 2016

(86) PCT No.: PCT/JP2016/068591
§ 371 (c)(1),
(2) Date: Sep. 26, 2017

(87) PCT Pub. No.: WO2017/002692
PCT Pub. Date: Jan. 5, 2017

(65) Prior Publication Data
US 2018/0071834 A1    Mar. 15, 2018

(30) Foreign Application Priority Data
Jun. 30, 2015   (JP) .................. 2015-131111

(51) Int. Cl.
B23B 31/20    (2006.01)
(52) U.S. Cl.
CPC ...... *B23B 31/202* (2013.01); *B23B 2231/201* (2013.01); *B23B 2231/2021* (2013.01);
(Continued)
(58) Field of Classification Search
CPC ............ B23B 31/202; B23B 2231/201; B23B 2231/2021; B23B 2231/2072;
(Continued)

(56) References Cited

U.S. PATENT DOCUMENTS 518,175 A * 4/1894 Brooks ................. B23B 31/202
                                                              279/51
1,483,008 A * 2/1924 Ozanne .................... A61C 1/18
                                                              279/53
(Continued)

FOREIGN PATENT DOCUMENTS

CH           373619       11/1963
DE       102012102914    11/2012
(Continued)

OTHER PUBLICATIONS

International Search Report dated Sep. 20, 2016 in International Application No. PCT/JP2016/068591.
(Continued)

Primary Examiner — Eric A Gates
(74) Attorney, Agent, or Firm — Wenderoth, Lind & Ponack, L.L.P.

(57) ABSTRACT

A chuck device includes: a cylindrical chuck including a first contact part on a first side and a second contact part on a second side, and configured to hold a bar-like workpiece; a tubular outer cylinder including a restriction part configured to restrict axial movement of the chuck by abutting on the first contact part; and a sleeve provided in an axially movable manner on the inner peripheral side of the outer cylinder, and including, on the first side, a pressing part axially driven to abut on the second contact part. The chuck includes a first tapered face in the first contact part, and a second tapered face in the second contact part. A first angle between the first tapered face and a center axis is equivalent to a second angle between the first tapered face and the center axis, or is smaller than the second angle.

3 Claims, 7 Drawing Sheets

(52) U.S. Cl.
CPC ............... *B23B 2231/2072* (2013.01); *Y10T 279/17435* (2015.01); *Y10T 279/17529* (2015.01)

(58) Field of Classification Search
CPC ..... Y10T 279/17435; Y10T 279/17529; Y10T 279/17547
See application file for complete search history.

(56) References Cited

U.S. PATENT DOCUMENTS

| | | | | |
|---|---|---|---|---|
| 1,655,659 | A * | 1/1928 | Nicolello | A61C 1/14 279/53 |
| 1,741,734 | A * | 12/1929 | Pannwitz | A61C 1/14 279/146 |
| 1,834,157 | A * | 12/1931 | Impey | A61C 1/14 279/51 |
| 1,917,752 | A * | 7/1933 | Connell | B23B 31/202 279/46.4 |
| 2,383,156 | A * | 8/1945 | Phillips | B23B 31/201 279/50 |
| 2,436,848 | A * | 3/1948 | Benjamin | B23B 31/201 279/50 |
| 2,495,050 | A * | 1/1950 | Banker | B23B 31/14 279/131 |
| 2,610,066 | A * | 9/1952 | Pigott | B23B 31/202 279/51 |
| 2,755,094 | A | 7/1956 | Benjamin | |
| 3,210,088 | A * | 10/1965 | Williamson | B23B 31/205 279/4.08 |
| 3,488,850 | A * | 1/1970 | Brooks | A61C 1/14 279/47 |
| 3,495,844 | A * | 2/1970 | Dee | A61C 1/144 279/137 |
| 3,496,638 | A * | 2/1970 | Martin | A61C 1/14 279/51 |
| 3,619,904 | A * | 11/1971 | Lundgren | A61C 1/14 279/53 |
| 5,867,912 | A * | 2/1999 | Hickok | A61B 17/3213 279/46.4 |
| 5,957,467 | A * | 9/1999 | Hornung | B23B 31/201 279/155 |
| 6,508,475 | B1 | 1/2003 | Strodtman et al. | |
| 2014/0232073 | A1 | 8/2014 | Marchand | |

FOREIGN PATENT DOCUMENTS

| | | |
|---|---|---|
| GB | 757499 | 9/1956 |
| JP | 40-23114 | 8/1965 |
| JP | 2001-225215 | 8/2001 |
| JP | 2002-59305 | 2/2002 |
| JP | 2002-059305 | 2/2002 |
| JP | 2014-522736 | 9/2014 |

OTHER PUBLICATIONS

Office Action dated Sep. 7, 2018 in corresponding of CZPV2017-803 with Partial English translation.

* cited by examiner

CHUCK DEVICE

TECHNICAL FIELD

The present invention relates to a chuck device.

BACKGROUND ART

A chuck device that holds a bar-like workpiece has been known (see PTL 1, for example).

CITATION LIST

Patent Literature

PTL 1: Japanese Patent Laid-Open No. 2001-225215

SUMMARY OF INVENTION

Technical Problem

When holding one in an axial direction of a workpiece by a chuck device and working on the other side in the axial direction, the workpiece needs to be held appropriately.

Hence, the present invention aims to provide a chuck device that can hold a workpiece appropriately.

Solution to Problem

To achieve she above objective, an embodiment of she present invention provides a chock device. The chuck device includes: a cylindrical chuck formed so that at least a part thereof in an axial direction is circumferentially divided, including a first contact part on a first side in the axial direction and a second contact part on a Second side opposite to the first side, and configured to hold a bar-like workpiece; a tubular outer cylinder covering an outer peripheral side of the chuck, and including, on the first side, a restriction part configured to restrict axial movement of the chuck by abutting on the first compel part; and a sleeve provided in an axially movable manner on an inner peripheral side of the outer cylinder, and including, on the first side, a pressing part axially driven to abut on the second contact part. A movement-restricting tapered face is formed in the restriction part of the outer cylinder, and a pressing tapered face is formed in the pressing part of the sleeve. The chuck includes, in the first contact part, a first tapered face whose outer diameter reduces toward an end on the first side, and includes, in the second contact part, a second tapered face whose outer diameter reduces toward an end on the second side. A first angle between the first tapered face and a center axis of the chuck is equivalent to a second angle between the second tapered face and the center axis, or is smaller than the second angle. An angle between the movement-restricting tapered face and the center axis, an angle between the pressing tapered face and the center axis, and an angle between the second tapered face and the center axis are equivalent.

Another embodiment of the present invention provides a chuck device. The chuck device includes: a cylindrical chuck formed so that at least a part thereof in an axial direction is circumferentially divided, including a first contact part on a first side in the axially direction and a second contact part on a second side opposite to the first side, and configured to hold a bar-like workpiece; a tubular outer cylinder covering an outer peripheral side of the chuck, and including, on the first side, a restriction part configured to restrict axial movement of the chuck by abutting on the first contact part; and a sleeve provided in an axially movable manner on an inner peripheral side of the outer cylinder, and including, on the first side, a pressing part axially driven to abut on the second contact part. A movement-restricting tapered face is formed in the restriction part of the outer cylinder, and a pressing tapered face is formed in the pressing part of the sleeve. The chuck includes, in the first contact part, a first tapered face whose outer diameter reduces toward an end on the first side, and includes, in the second contact part, a second tapered face whose outer diameter reduces toward an end on the second side. The first tapered face includes at least two tapered face parts. Angles respectively formed between the at least two tapered face parts and a center axis of the chuck are different from each other. The at least two tapered face parts abut on the movement-restricting tapered face.

According to an embodiment of the present invention, a workpiece can be held appropriately.

DESCRIPTION OF EMBODIMENTS

[First Embodiment] A first embodiment of the present invention will be described by referring to FIGS. 1 to 6.

Figure 1:
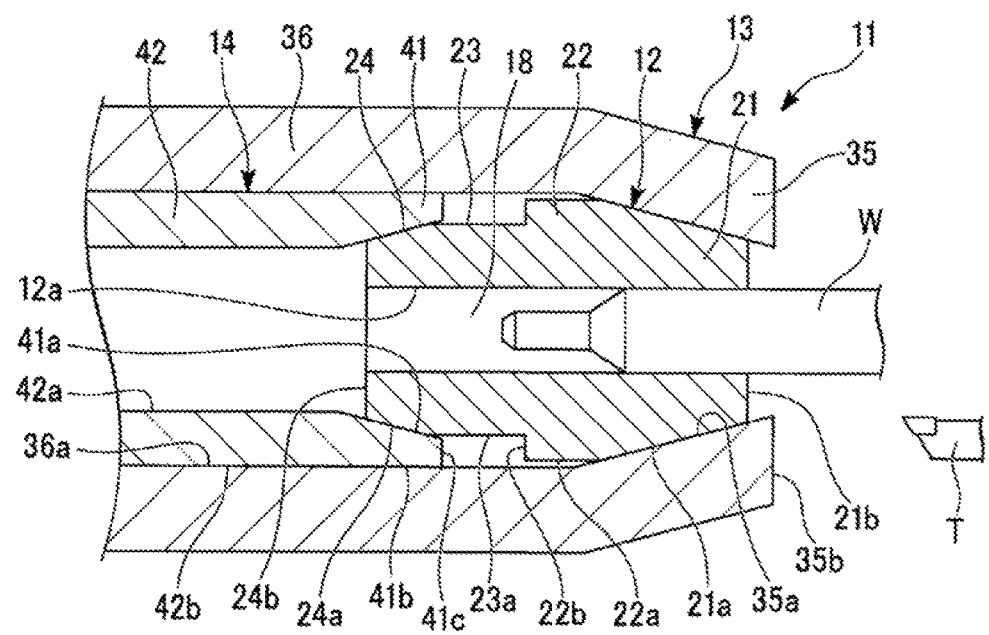
FIG. 1 is a cross-sectional view of a workpiece holding-state illustrating a chuck device of a first embodiment of the present invention.

A chuck device 11 of the embodiment illustrated in FIG. 1 is provided in a cutting machine such as an NC lathe. When provided in an NC lathe, the chuck device 11 rotates while holding a part on one side in the axial direction of a bar-like workpiece W, and moves, along a preset trajectory, relative to a cutting tool T provided on the outside. This allows the cutting tool T to come into contact with and move relative to a part on the other side in the axial direction protruding from the chuck device 11, of the workpiece W rotating integrally with the chuck device 11, and cut the part on the other side in the axial direction.

The chuck device 11 includes a cylindrical chuck 12, a tabular cap nut 13 that is an outer tube covering the outer peripheral side of the chuck 12, and a cylindrical sleeve 14 that is provided on the inner peripheral side of the cap nut 13. The chuck 12 and the sleeve 14 are arranged side by side in the axial direction inside the cap nut 13. Of the chuck 12 and the sleeve 14, the chuck 12 is placed on the cutting tool T side at the time of machining, while the sleeve 14 is placed, with respect 10 the chuck 12, on the opposite side of the cutting tool T at the time of machining. In the following description, in the chuck device 11, the cutting tool T side (i.e., tip end side) in the axial direction is referred to as a front side, and the opposite side (i.e., base end side) of the cutting tool T in the axial direction is referred to as a rear side.

The chuck 12 is a part that comes into contact with and holds the bar-like workpiece W. The chuck 12 is a one-body piece formed of a single material, and has a through hole 18 axially penetrating therethrough at its center in the radial direction. Hence, the chuck 12 is formed into a cylindrical shape. The through hole 18 has a circular section at every plane perpendicular to its center axis. With the through hole 18 formed, in the chuck 12, an inner peripheral face 12a which is a cylindrical face having a constant inner diameter at any axial position.

The chuck 12 includes, from the front side which is the one side in the axial direction, in this order, a front tapered tubular portion 21 (first contact part), a middle large-diameter cylindrical portion 22, a middle small-diameter cylindrical portion 23, and a rear tapered tubular portion 24 (second contact part). The chuck 12 has the aforementioned through hole 18 that penetrates all of these parts. The rear tapered tubular portion 24 is provided on an end part on the rear side which is the other side in the axial direction of the chuck 12.

A front tapered face 21a (first tapered face) whose outer diameter reduces toward the front end is formed on an outer peripheral part of the front tapered tubular portion 21. Accordingly, the outer peripheral part of the front tapered tubular portion 21 is tapered. A center axis of the front tapered face 21a coincides with a center axis of the inner peripheral face 12a. A front end face 21b on the front side of the from tapered tubular portion 21 is perpendicular to the center axis of the front tapered face 21a.

The middle large-diameter cylindrical portion 22 is shorter than the front tapered tubular portion 21 in axial length. A large-diameter cylindrical face 22a having a constant outer diameter at any axial position is formed on an outer peripheral part of the middle large-diameter cylindrical port urn 22. A center axis of the large-diameter cylindrical face 22a coincides with the center axis of the front tapered face 21a, and the large-diameter cylindrical face 22a is continuous with an end edge part on the rear side of the front tapered face 21a. Accordingly, the outer diameter of the large-diameter cylindrical face 22a is equivalent to the maximum outer diameter of the front tapered face 21a. The outer diameter of the large-diameter cylindrical face 22a is the maximum outer diameter of the chuck 12. The outer diameter of the middle large-diameter cylindrical portion 22 is larger than the outer diameter of the middle small-diameter cylindrical portion 23 on the rear side thereof, and therefore an end face 22b is formed on an end part on the rear side of the middle large-diameter cylindrical portion 22. The end face 22b is perpendicular to the large-diameter cylindrical face 22a.

The middle small-diameter cylindrical portion 23 is longer than the middle large-diameter cylindrical portion 22 and shorter than the front tapered tubular portion 21, in axial length. A small-diameter cylindrical face 23a having a constant outer diameter at any axial position is formed on an outer peripheral part of the middle small-diameter cylindrical portion 23. The outer diameter of the small-diameter cylindrical face 23a, which is the outer diameter of the middle small-diameter cylindrical portion 23, is smaller than the outer diameter of the large-diameter cylindrical face 22a of the middle large-diameter cylindrical portion 22. A center axis of the small-diameter cylindrical face 23a coincides with the center axis of the large-diameter cylindrical face 22a, and the small-diameter cylindrical face 23a is continuous with an inner peripheral edge part of the end face 22b of the middle large-diameter cylindrical portion 22.

The rear tapered tubular portion 24 is shorter than the middle small-diameter cylindrical portion 23 in axial length. A rear tapered face 24a (second tapered face) whose outer diameter reduces toward the rear end is formed on an outer peripheral part of the rear tapered tubular portion 24. Accordingly, the outer peripheral part of the rear tapered tubular portion 24 is tapered. A center axis of the rear tapered face 24a coincides with the center axis of the small-diameter cylindrical face 23a of the middle small-diameter cylindrical portion 23, and the rear tapered face 24a is continuous with an end edge part on the rear side of the small-diameter cylindrical face 23a. Accordingly, the maximum outer diameter of the rear tapered face 24a is equivalent to the outer diameter of the small-diameter cylindrical face 23a. A rear end face 24b on the rear side of the rear tapered tubular portion 24 is perpendicular to the center axis of the rear tapered face 24a.

Figure 2:
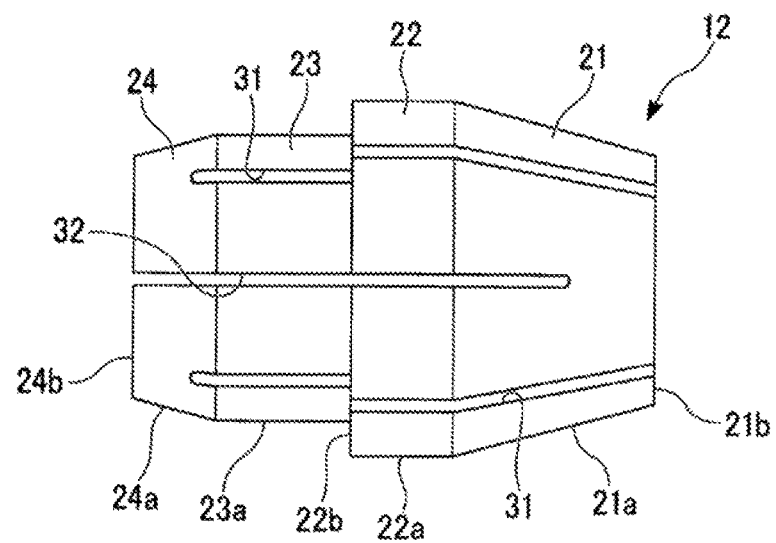
FIG. 2 is a side view illustrating a chuck of the chuck device of the first embodiment of the present invention.
Figure 3:
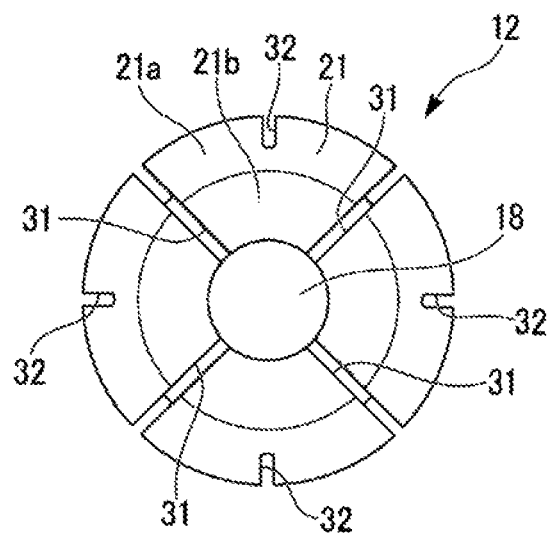
FIG. 3 is a front view illustrating the chuck of the chuck device of the first embodiment of the present invention.
Figure 4:
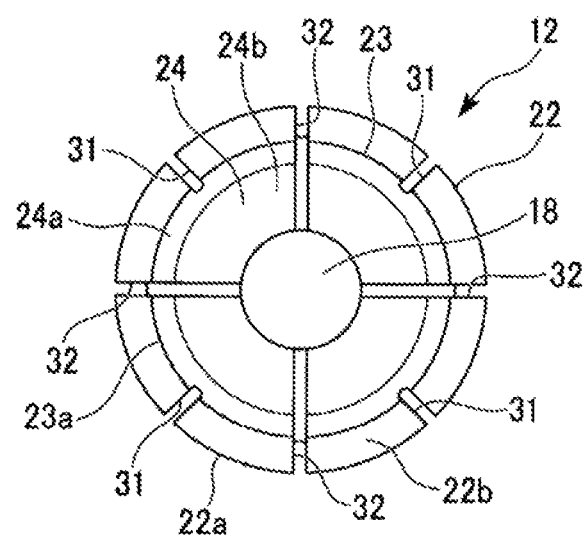
FIG. 4 is a rear view illustrating the chuck of the chuck device of the first embodiment of the present invention.

As illustrated in FIGS. 2 to 4, the chuck 12 has a plurality of (specifically, four) front slots 31 which are same shaped slots evenly spaced in the circumferential direction. The front slot 31 is formed into a flat shape along the axial and radial directions of the chuck 12, and extends from the front end face 21b of the front tapered tabular portion 21, while penetrating the front tapered tabular portion 21, the middle large-diameter cylindrical portion 22, and the middle small-diameter cylindrical portion 23, to an intermediate point of the rear tapered tubular portion 24. In other words, each of the four front slots 31 is formed in a part, and not the entirety of the axial direction of the chuck 12. A part of the chuck 12 in the axial direction is circumferentially divided (specifically, evenly divided into quarters) by the front slots 31 formed therein.

The chuck 12 has a plurality of (specifically, four) rear slots 32 which are same shaped slots evenly spaced in the circumferential direction. The rear slot 32 is formed into a flat shape along the axial and radial directions of the chuck 12, and extends from the rear end face 24b of the rear tapered tubular portion 24, while penetrating the rear tapered tubular portion 24, the middle small-diameter cylindrical portion 23, and the middle large-diameter cylindrical portion 22, to an intermediate point of the front tapered tubular portion 21. In other words, each of the four rear slots 32 is formed in a part, and not the entirety of the axial direction of the chuck 12. The pitch of the four rear slots 32 is shifted by half pitch from the pitch of the same number of front slots 31. In other words, the four rear slots 32 are each placed in the center between circumferentially adjacent front slots 31 of the chuck 12.

A part of the chuck 12 in the axial direction is circumferentially divided (specifically, evenly divided into quarters) by the rear slots 32. Note that since the front slots 31 and rear slots 32 overlap each other in the axial direction of the chuck 12, an area of the chuck 12 where the front slots 31 and rear slots 32 overlap each other in the axial direction is divided into eight equal parts.

As illustrated in FIG. 1, the cap nut 13 includes a restriction portion 35 provided on the front side which is one side in the axial direction thereof, and a body portion 36 on the rear side with respect to the restriction portion 35. The body portion 36 is formed into a cylindrical shape, and includes an inner peripheral face 36a which is a cylindrical face having a constant inner diameter at any axial position. The inner diameter of the body portion 36, that is, the inner diameter of the inner peripheral face 36a is larger than the outer diameter of the large-diameter cylindrical face 22a of the middle large-diameter cylindrical portion 22 which is the maximum outer diameter of the chuck 12.

The restriction portion 35 protrudes radially inward beyond the inner peripheral face 36a of the body portion 36, and is formed into an annular shape. A movement-restricting tapered face 35a whose inner diameter reduces toward the front end is formed on an inner peripheral part of the restriction portion 35. Accordingly, the inner peripheral part of the restriction portion 35 is tapered. A center axis of the movement-restricting tapered face 35a coincides with a center axis of the inner peripheral face 36a of the body portion 36, and the movement-restricting tapered face 35a is continuous with an end edge part on the front side of the inner peripheral face 36a of the body portion 36. The maximum inner diameter of the movement-restricting tapered face 35a is the same as the inner diameter of the inner peripheral face 36a of the body portion 36. A front end face 35b on the front side of the restriction portion 35 is perpendicular to the center axis of the movement-restricting tapered face 35a.

The restriction portion 35 of the cap nut 13 is formed such that its minimum inner diameter is smaller than the minimum outer diameter of the front tapered tubular portion 21 of the chuck 12, and its maximum inner diameter is larger than the maximum outer diameter of the front tapered tubular portion 21 of the chuck 12. The restriction portion 35 abuts on the front tapered tabular portion 21 of the chuck 12, whereby restricting frontward movement in the axial direction of the chuck 12. In other words, the chuck 12 is restricted from moving frontward in the axial direction when its front tapered tubular portion 21 abuts on the restriction portion 35 of the cap nut 13. The restriction portion 33 of the cap nut 13 restricts frontward movement of the chuck 12 in the axial direction, by bringing its movement-restricting tapered face 35a into contact with the front tapered face 21a of the front tapered tubular portion 21 of the chuck 12.

The sleeve 14 is formed into a cylindrical shape, and includes a pressing portion 41 provided on the front side which is one side in the axial direction thereof, and a mam body portion 42 on the rear side with respect to the pressing portion 41. The main body portion 42 is a cylinder, and includes an inner peripheral face 42a formed of a cylindrical face having a constant inner diameter at any axial position, and an outer peripheral face 42b formed of a cylindrical face having a constant outer diameter at any axial position. Center axes of the inner peripheral face 42a and the outer peripheral face 42b of the main body portion 42 coincide with each other.

The pressing portion 41 is formed into an annular shape. A pressing tapered face 41a whose inner diameter increases toward the front end is formed on an inner peripheral part of the pressing portion 41. Accordingly, the inner peripheral part of the pressing portion 41 is tapered. A center axis of the pressing tapered face 41a coincides with the center axis of the inner peripheral face 42a of the main body portion 42, and the pressing tapered face 41a is continuous with an end edge part on the front side of the inner peripheral face 42a of the main body portion 42. Accordingly, the minimum inner diameter Of the pressing tapered face 41a is equivalent to the inner diameter of the inner peripheral face 42a of the main body portion 42. An outer peripheral face 41b having a constant diameter at any axial position is formed on an outer peripheral part of the pressing portion 41. A center axis of the outer peripheral face 41b of the pressing portion 41 coincides with the center axis of the outer peripheral face 42b of the main body portion 42, and the outer peripheral face 41b is continuous with an end edge part on the from side of the outer peripheral face 42b of the main body portion 42, in such a manner as to form the same cylindrical face as the outer peripheral face 42b of the main body portion 42. A front end face 41c on the front side of the pressing portion 41 is perpendicular to the outer peripheral face 41b of the pressing portion 41.

Of the sleeve 14, the outer peripheral face 42b of the main body portion 42 and the outer peripheral face 41b of the pressing portion 41 slide on the inner peripheral face 36a of the body portion 36 of the cap nut 13. In other words, the sleeve 14 is provided on the inner peripheral side of the cap nut 13 in an axially movable manner. The sleeve 14 is axially driven by unillustrated driving means provided on the rear side, and reciprocates in the axial direction inside the cap nut 13.

The pressing portion 41 is formed such that its minimum inner diameter is smaller than the minimum outer diameter of the rear tapered tubular portion 24 of the chuck 12, and its maximum inner diameter is larger than the maximum outer diameter of the rear tapered tubular portion 24 of the chuck 12. When the sleeve 14 is driven frontward in the axial direction by the driving means, the pressing portion 41 abuts on the rear tapered tubular portion 24 of the chuck 12, and presses the chuck 12 frontward in the axial direction. In other words, the rear tapered tubular portion 24 of the chuck 12 abuts on the pressing portion 41 of the sleeve 14, and the chuck 12 is pressed frontward in the axial direction by the pressing portion 41. The pressing tapered face 41a of the pressing portion 41 of the sleeve 14 abuts on the rear tapered face 24a of the rear tapered tubular portion 24 of the chuck 12, and presses the chuck 12 frontward in the axial direction.

Figure 5:
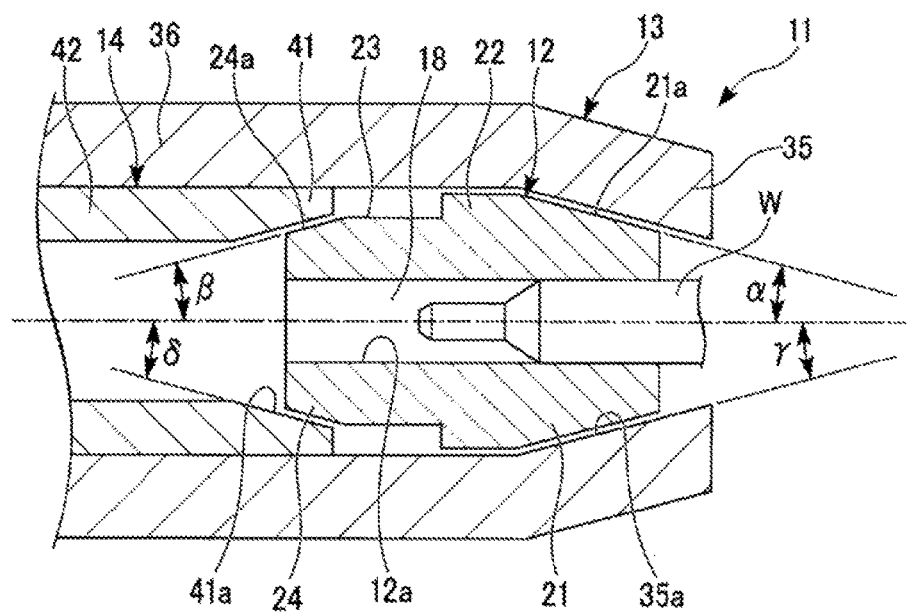
FIG. 5 is a cross-sectional view of a state before holding a workpiece, illustrating the chuck device of the first embodiment of the present invention.

When holding the workpiece W by the chuck device 11, the unillustrated driving means drives the sleeve 14 frontward in the axial direction, as shown from FIG. 5 to FIG. 1. Then, the pressing tapered face 41a of the pressing portion 41 of the sleeve 14 abuts on the rear tapered face 24a of the rear tapered tubular portion 24 of the chuck 12, and presses the chuck 12 frontward in the axial direction. This moves the chuck 12 frontward in the axial direction, and brings the front tapered face 21a of the front tapered tubular portion 21 into contact with the movement-restricting tapered face 35a of the restriction portion 35 of the cap nut 13, whereby frontward movement in the axial direction is restricted.

Then, when the unillustrated driving means drives the sleeve 14 further to the front side in the axial direction, the rear tapered tubular portion 24 of the chuck 12 receives a radially inward force, that is, a force in a diameter reducing direction from the pressing portion 41 of the sleeve 14 due to inclination of the rear tapered face 24a. At this time, the front tapered tubular portion 21 of the chuck 12 receives a radially inward force, that is, a force in a diameter reducing direction from the restriction portion 35 of the cap nut 13 due to inclination of the front tapered face 21a. In the chuck 12, the rear tapered tubular portion 24 side is reduced in diameter while narrowing of the width of the rear slots 32 on the rear side, by the diameter reducing direction-force applied on the rear tapered tubular portion 24 side. The front tapered tabular portion 21 side is reduced in diameter while narrowing of the width of the front slots 31 on the front side by the diameter reducing direction-force applied on the front tapered tubular portion 21 side. Accordingly, the chuck 12 holds the workpiece W in an integrally rotatable manner by reducing the inner peripheral face 12a in diameter.

On the other hand, when releasing the hold of the workpiece W by the chuck device 11, the unillustrated driving means drives the sleeve 14 rearward in the axial direction, as shown form FIG. 1 to FIG. 5. Then, the pressing tapered face 41a of the pressing portion 41 of the sleeve 14 separates from the rear tapered face 24a of the rear tapered tubular portion 24 of the chuck 12. Then, the chuck 12 uses its spring back-force to increase the rear tapered tubular portion 24 in diameter by widening the width of the rear slots 32 on the rear side, and also to increase the front tapered tubular portion 21 in diameter by widening the width of the front slots 31 on the front side. When the diameters increase, the front tapered face 21a of the front tapered tubular portion 21 receives a reaction force in an axially separating direction from the movement-restricting tapered face 35a of the restriction portion 35 of the cap nut 13, whereby the chuck 12 is moved rearward. The workpiece W thus released from being held by the chuck device 11 may be delivered not only to the front side from the chuck device 11, but also may be delivered to the rear side from the chuck device 11.

In the first embodiment, when the chuck 12 is in a natural state where it does not receive pressing force from the sleeve 14 or the cap nut 13 as illustrated in FIG. 5, an angle α between the front tapered face 21a and its center axis is equivalent to an angle β between the rear tapered face 24a and its center axis. Although there are two "angles" on the large side and the small side except for when the angle is 90 degrees, in this description, a "angle" always refers to the angle on the small side. Additionally when the sleeve 14 and the cap nut 13 do not press the chuck 12 as shown in FIG. 5 an angle γ between the movement-restricting tapered face 35a and its center axis is equivalent to an angle δ between the pressing tapered face 41a and its center axis.

The angle γ between the movement-restricting tapered face 35a and its center axis and the angle δ between the pressing tapered face 41a and its center axis are equivalent to the angle α between the front tapered face 21a of the chuck 12 and its center axis and the angle β between the rear tapered face 24a of the chuck 12 and its center axis in the natural state. Specifically, in the natural state, the angles α, β, γ, and δ respectively formed between the front tapered face 21a, the rear tapered face 24a, the movement-restricting tapered face 35a, and the pressing tapered face 41a and their center axes are all 15 degrees.

When the chuck device 11 of the first embodiment is provided in an NC lathe as mentioned earlier, for example, the chuck device 11 holds a part on one side in the axial direction of the workpiece W fed manually or by an unillustrated feeder, and rotates integrally with the workpiece W.

Figure 6:
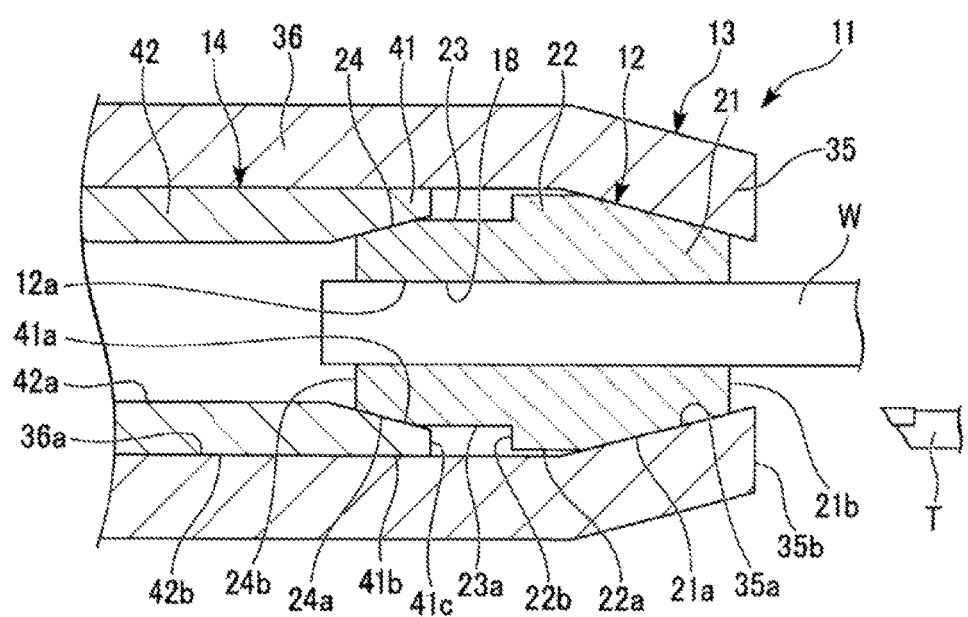
FIG. 6 is a cross-sectional view of another holding state illustrating the chuck device of the first embodiment of the present invention.

In this state, the cutting tool T of the NC lathe performs turning on a part on the other side in the axial direction of the workpiece W protruding from the chuck device 11. The NC lathe may perform furning while holding the workpiece W only on the front side of the chuck 12 in the axial direction as illustrated in FIG. 1, or may perform turning while holding the workpiece W over the area of the entire length of the chuck 12 including both sides thereof in the axial direction, as illustrated in FIG. 6.

The chuck device 11 of the first embodiment may hold a part on one side in the axial direction of the workpiece W after turning has been performed on the part on the one side in the axial direction in the former step, and draw out the workpiece W from the chuck device of the former step. In particular, in this case, the chuck device 11 may rotate while holding the workpiece W only on the front side of the chuck 12, and the cutting tool T of the NC lathe may perform turning on the part on the other side in the axial direction of the workpiece W protruding from the chuck device 11.

A holding force may be insufficient in the aforementioned PTL 1, when holding one side in an axial direction of a workpiece by a chuck device and machining the other side in the axial direction thereof.

In the chuck device 11 of the first embodiment, the movement-restricting tapered face 35a that abuts on the front tapered face 21a of the front tapered tubular portion 21 is formed in the restriction portion 35 of the cap nut 13 that abuts on the front tapered tubular portion 21 on one side in the axial direction of the chuck 12, and the pressing tapered face 41a that abuts on the rear tapered face 24a of the rear tapered tubular portion 24 is formed in the pressing portion 41 of the sleeve 14 that abuts on the rear tapered tubular portion 24 on the other side in the axial direction of the chuck 12. In addition, the angles α, β respectively formed between the front tapered face 21a and the rear tapered face 24a and their center axes are equivalent to each other, while the angles γ, δ, β respectively formed between the movement-restricting tapered face 35a, the pressing tapered face 41a, and the rear tapered face 24a and their center axes are equivalent to each other. Therefore, the angles α, β, γ, δ are equivalent. This can average the pressing forces acting on the chuck 12 from the pressing portion 41 of the sleeve 14 and the restriction portion 35 of the cap nut 13. Accordingly, the chuck 12 can hold the workpiece W appropriately. The chuck 12 can also hold the workpiece W appropriately when holding only on the front side of the chuck 12 in the axial direction.

A part of the chuck 12 on the front side in the axial direction is circumferentially evenly divided into quarters by the four front slots 31 formed therein, and a part of the chuck 12 on the near side in the axial direction is circumferentially evenly divided into quarters by the four rear slots 32 formed therein. This increases the spring back-force of the chuck 12 itself and increases the force by which the chuck 12 separates in the axial direction from the restriction portion 35 when released from being held. Hence, it is possible to suppress bite of the chuck 12 to the restriction portion 35 that often occurs when releasing the hold.

[Second Embodiment] Next, a second embodiment will be described by focusing on parts different from the first embodiment and referring mainly to FIG. 7. Note that parts common to the first embodiment are indicated by the same names and reference numerals.

A chuck device 11A of the second embodiment includes a chuck 12A that partially differs from the chuck 12, and the chuck 12A includes a front tapered tubular portion 21A (first contact part) that partially differs from the front tapered tubular portion 21. Specifically, the front tapered tubular portion 21A has an outer diameter that reduces toward the front end, and a center axis of the front tapered tubular portion 21A coincides with a center axis of a large-diameter cylindrical face 22a of a middle large-diameter cylindrical portion 22, as in the case of the front tapered tubular portion 21, but includes a front tapered face 21Aa (first tapered face) inclined at a different angle.

Figure 7:
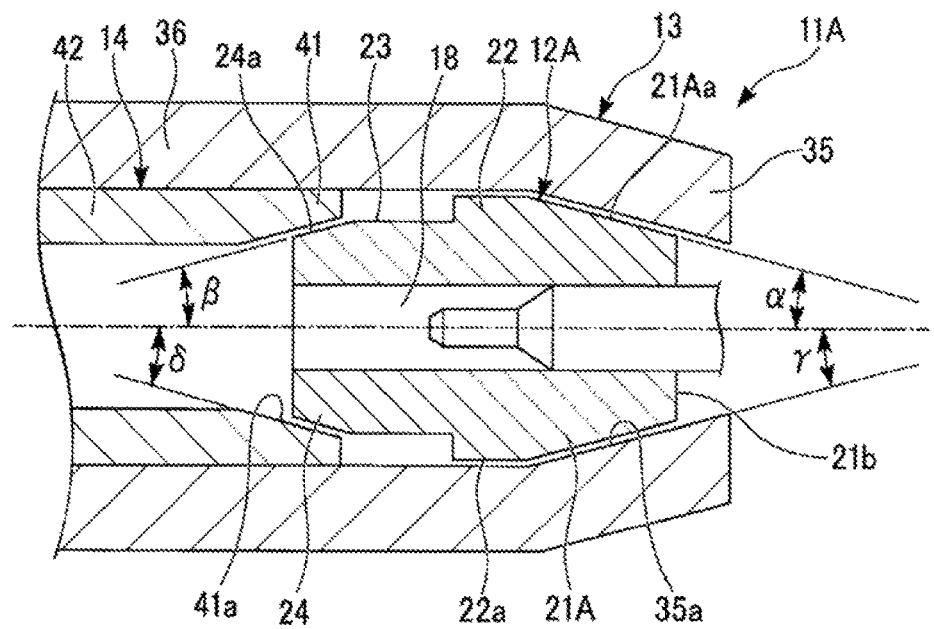
FIG. 7 is a cross-sectional view of a state before holding a workpiece, illustrating a chuck device of a second embodiment of the present invention.

When the chuck 12A is in a natural state where it does not receive pressing force from a sleeve 14 or a cap nut 13 as illustrated in FIG. 7, an angle α between the front tapered face 21Aa and its center axis is smaller than an angle β between a rear tapered face 24a and its center axis. As in the case of the first embodiment, angles γ, δ, β, respectively between a movement-restricting tapered face 35a, a pressing tapered face 41a, and the rear tapered face 24a and their center axes are equivalent to each other. Specifically, when the chuck 12A is in the natural state, the angle β between the rear tapered face 24a and its center axis, the angle γ between the movement-restricting tapered face 35a and its center axis, and the angle δ between the pressing tapered face 41a and its center axis are all 15 degrees. Meanwhile, the angle α between the front tapered face 21Aa and its center axis is 14.45 degrees.

Thus, in the chuck 12A, the angle α between the front tapered face 21Aa and its center axis is smaller than the angle β between the rear tapered face 24a and its center axis, and therefore is smaller than the angle γ between the movement-restricting tapered face 35a and its center axis. Since the front slots 31 (see FIG. 2) are formed in the chuck 12A, when the workpiece W is held, the front slots 31 narrow the width of the chuck 12A on the front side while leaving the width of the base portion of the chuck 12A on the rear side as it is. Hence, the angle α between the front tapered face 21Aa and its center axis is made larger after holding than before holding, and becomes closer to the angle γ between the movement-restricting tapered face 35a, which receives the pressing force, and its center axis. In other words, the front tapered face 21Aa of the chuck 12A is brought into surface contact with the movement-restricting tapered face 35a. Since the front tapered face 21Aa is in surface contact with the movement-restricting tapered face 35a, it is possible to further suppress bite of the front tapered tubular portion 21A of the chuck 12A to the restriction portion 35 of the cap nut 13 that often occurs when retracting the sleeve 14 to the rear side to release the hold.

[Third Embodiment] Next, a third embodiment will be described by focusing on parts different from the first embodiment, and referring mainly to FIGS. 8 and 9. Note that parts common to the first embodiment are indicated by the same names and reference numerals.

Figure 8:
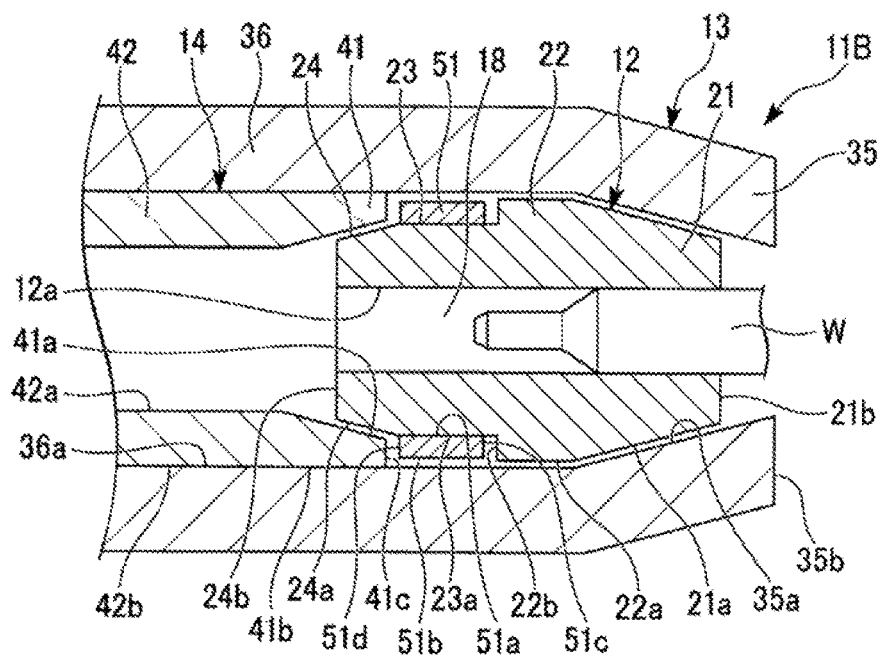
FIG. 8 is a cross-sectional view of a state before holding a workpiece, illustrating a chuck device of a third embodiment of the present invention.

As illustrated in FIG. 8, in a chuck device 11B of the third embodiment a ring 51 is provided on the outer peripheral side of a middle small-diameter cylindrical portion 23 of a chuck 12, in such a manner as to cover its small-diameter cylindrical face 23a. The ring 51 has an inner diameter that is slightly larger than the outer diameter of the middle small-diameter cylindrical portion 23 of the chuck 12, and an outer diameter that is smaller than the inner diameter of a body portion 36 of a cap nut 13. The ring 51 is formed into a cylindrical shape, and includes an inner peripheral face 51a which is a cylindrical face having a constant inner diameter at any axial position, and an outer peripheral face 51b which is a cylindrical face having a constant outer diameter at any axial position. A center axis of the inner peripheral face 51a and a center axis of the outer peripheral face 51b coincides with each other. The ring 51 includes a front end face 51c on the front side and a rear end face 51d on the rear side which are perpendicular to the inner peripheral face 51a and the outer peripheral face 51b.

Figure 9:
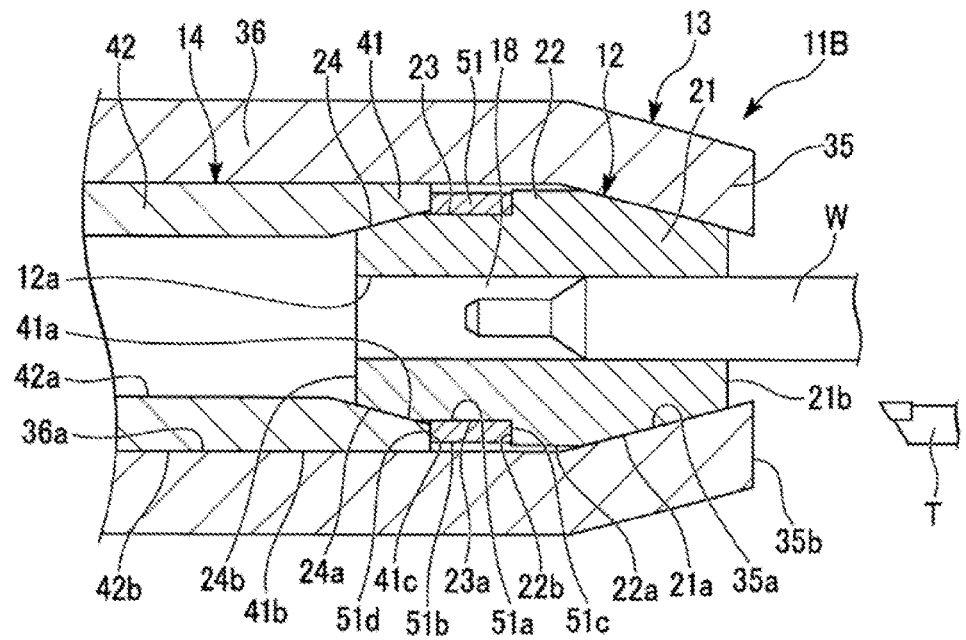
FIG. 9 is a cross-sectional view of a workpiece holding-state illustrating the chuck device of the third embodiment of the present invention.

The axial length of the ring 51 is a length that enables direct transmission of an axial drive force of driving means from a sleeve 14 to a middle large-diameter cylindrical portion 22 of the chuck 12 when holding a workpiece W, as shown from FIG. 8 to FIG. 9. That is, as in the aforementioned case, when the sleeve 14 is driven frontward, a pressing portion 41 of the sleeve 14 reduces a rear tapered tubular portion 24 side of the chuck 12 in diameter, and a restriction portion 35 of the cap nut 13 reduces a from tapered tubular portion 21 side of the chuck 12 in diameter, whereby the chuck 12 holds a workpiece W. The length of the ring 51 is set such that its rear end face 51d abuts on a front end face 41c of the pressing portion 41 of the sleeve 14, and its front end face 51c abuts on an end face 22b of the middle large-diameter cylindrical portion 22 of the chuck 12, at least before the point when the chuck 12 holds the workpiece W in the above manner.

By providing such a ring 51, it is possible to transmit axial drive force of the driving means from the sleeve 14 to the middle large-diameter cylindrical portion 22 of the chuck 12 through the ring 51, when holding the workpiece W. This axial drive force deforms the middle large-diameter cylindrical portion 22 and the front tapered tubular portion 21 of the chuck 12, in such a manner as to reduce the front side of the chuck 12 in diameter, around the base side of the front slots 31 (see FIG. 2). Accordingly, the front side of the chuck 12 can be further reduced in diameter in addition to the reduction thereof in diameter by pressing by the restriction portion of the cap nut 13, whereby holding three on the front side can be increased. Accordingly, holding force can be increased in particular, even when the workpiece W is held only by the front side of the chuck 12.

Note that the ring 51 of the third, embodiment may be provided in the aforementioned chuck device 11A of the second embodiment.

[Fourth Embodiment] Next, a fourth embodiment will be described by focusing on parts different from the third embodiment and referring mainly to FIGS. 10 to 13. Note that parts common to the third embodiment are indicated by the same names and reference numerals.

Figure 10:
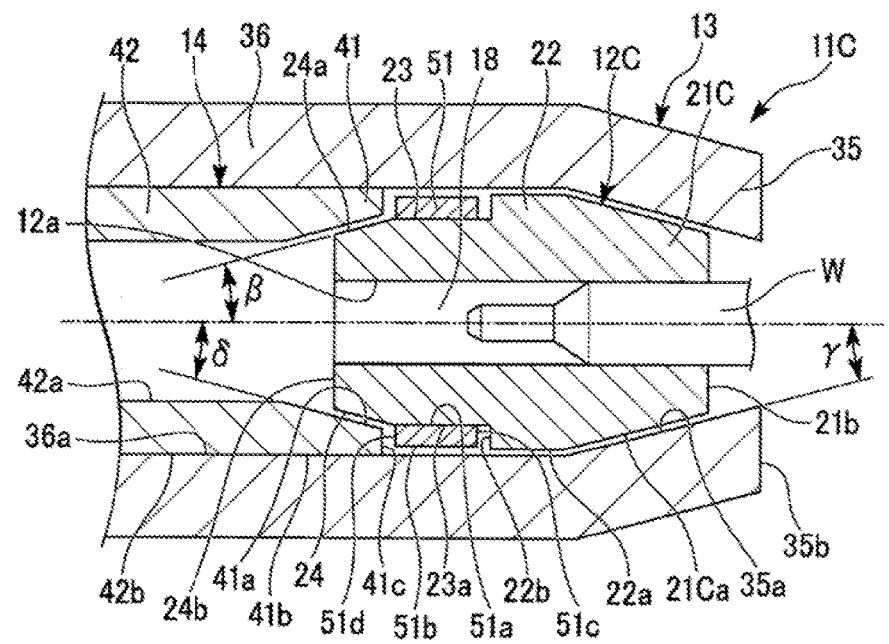
FIG. 10 is a cross-sectional view of a state before holding a workpiece, illustrating a chuck device of a fourth embodiment of the present invention.

A chuck device 11C of the fourth embodiment illustrated in FIG. 10 includes a chuck 12C that partially differs from the chuck 12, and the chuck 12C includes a front tapered tubular portion 21C (first contact part) that partially differs from the front tapered tubular portion 21. Specifically, the front tapered tubular portion 21C has an outer diameter that reduces toward the front end and a center axis of the front tapered tubular portion 21C coincides with a center axis of a large-diameter cylindrical face 22a of a middle large-diameter cylindrical portion 22, as in the case of the from tapered tubular portion 21, but includes a differently shaped front tapered face 21Ca (first tapered face).

Figure 11:
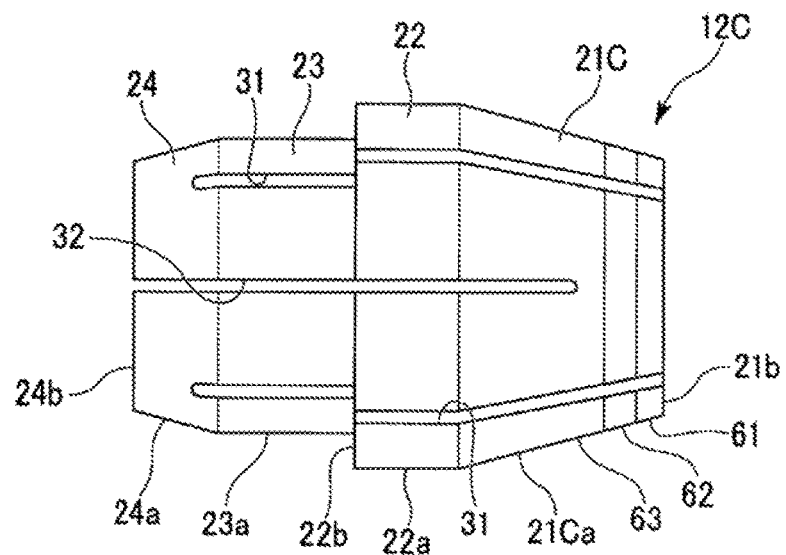
FIG. 11 is a side view illustrating a chuck of the chuck device of the fourth embodiment of the present invention.

As illustrated in FIG. 11, she front tapered face 21Ca includes, from the front side which is one side in the axial direction. In this order, a tapered face portion 61 (third tapered face part), a tapered face portion 62 (first tapered face part), and a tapered face portion 63 (second tapered face part). The tapered face portion 61 and the tapered face portion 62 have the equivalent axial lengths, white the tapered face portion 63 has a longer axial length.

Figure 12:
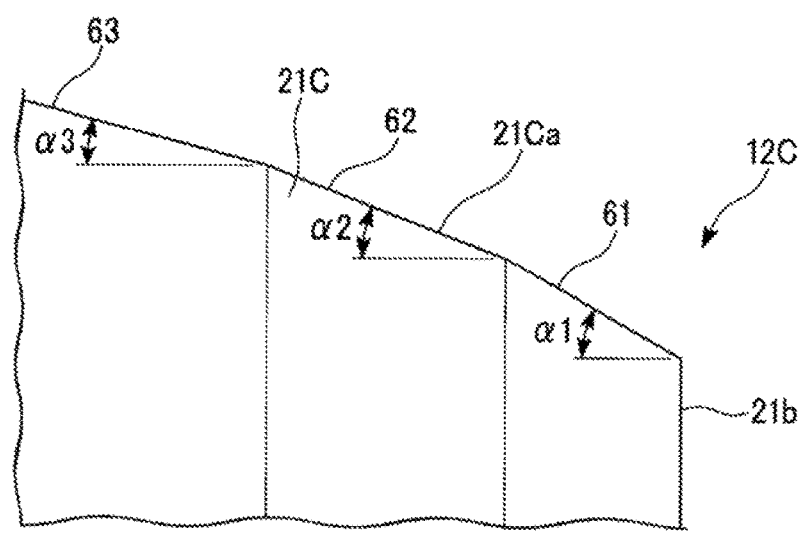
FIG. 12 is a partial side view illustrating the chuck of the chuck device of the fourth embodiment of the present invention.

Angles respectively formed between the tapered face portions 61 to 63 and their center axes differ from each other. As illustrated in FIG. 12, of the tapered face portions 61 to 63, the tapered face portion 61 closest to the front forms an angle α1 with its center axis that is the largest of the tapered face portions 61 to 63, the tapered face portion 62 in the middle in the axial direction forms an angle with its center axis that is smaller than the tapered face portion 61, and the tapered face portion 63 closest to the rear forms an angle with its center axis that is smaller than the tapered face portion 62 in the middle in the axial direction, and is smallest of the tapered face portions 61 to 63.

Accordingly, regarding angles α2, α3 respectively formed between the two tapered face portions 62, 63 in the middle in the axial direction and on the rear side and their center axes, the angle α3 formed of the tapered face portion 63 on the rear side is smaller than the other angle α2 formed of the tapered face portion 62 in the middle in the axial direction on the end side (front side). Additionally, the front tapered face 21Ca includes, on the end side (front side) with respect to the tapered face portion 62 in the middle in the axial direction, the tapered face portion 61 on the front side that forms the angle α1 with its center axis that is larger than the angle α2 between the tapered face portion 62 in the middle in the axial direction and its center axis.

Then, when the chuck 12C is in a natural state where it does not receive pressing force from a sleeve 14 or a cap nut 13 as illustrated in FIG. 10, the angle α2 between the tapered face portion 62 in the middle in the axial direction of the font tapered face 21Ca and its center axis is equivalent to the angle β between a rear tapered face 24a and its center axis illustrated in FIG. 10. In addition, an angle γ between a movement-restricting tapered face 35a and its center axis an angle δ between a pressing tapered face 41a and its center axis, and the angle β between the rear tapered face 24a of the chuck 12C in the natural state and its center axis are equivalent to each other. Therefore, the angles α2, β, γ, δ are equivalent to each other.

Thus, in the chuck 12C of the fourth embodiment, the angle α2 between the tapered face portion 62 in the middle in the axial direction of the front tapered face 21Ca and its center axis is equivalent to the angle γ between the movement-restricting tapered face 35a and its center axis, and the angle α3 between the tapered face portion 63 on the rear side of the front tapered face 21Ca and its center axis is smaller than the angle γ between the movement-restricting tapered face 35a and its center axis. Moreover, the angle α1 between the tapered face portion 61 on the front side of the front tapered face 21Ca and its center axis is larger than the angle γ between the movement-restricting tapered face 35a and its center axis.

Specifically, when the chuck 12C is in the natural state, the angle α2 between the tapered face portion 62 in the middle in the axial direction of the front tapered face 21Ca and its center axis is 15 degrees, and the angle γ between the movement-restricting tapered face 35a and its center axis, the angle δ between the pressing tapered face 41a and Its center axis, and the angle β between the rear tapered face 24a of the chuck 12C in the natural state and its center axis are all 15 degrees. When the chuck 12C is in the natural state, the angle α1 between the tapered face portion 61 on the front side of the front tapered face 21Ca and its center axis is 15.15 degrees, and the angle α3 between the tapered face portion 63 on the rear side of the front tapered face 21Ca and its center axis is 14.45 degrees.

Furthermore, the ring 51 of the third embodiment is provided in the chuck device 11C of the fourth embodiment.

When holding a workpiece W, of the front tapered face 21Ca of the chuck 12C, the tapered face portion 62 in the middle in the axial direction, winch forms the same angle as the movement-restricting tapered face 35a with its center axis, first comes into contact with the movement-restricting tapered face 35a and receives pressing force in a diameter reducing direction from the restriction portion 35. This reduces the chuck 12C in diameter while narrowing the width of the front slots 31 on the front side. Hence, the diameter is reduced while an angle between the front tapered face 21Ca and the center axis is made larger than before the pressing. As a result, the angle α3 between the tapered face portion 63 on the rear adjacent side and its center axis becomes closer to the angle γ between the movement-restricting tapered face 35a receiving the pressing force and its center axis. Then, the front tapered face 21Ca abuts on the movement-restricting tapered face 35a at two tapered face portions 62, 63 that form different angles with their center axes.

At this time, the tapered face portion 62 and the tapered face portion 63 of the chuck 12C are formed into shapes protruding outward in the radial direction, and therefore a border between the tapered face portion 62 and the tapered face portion 63 receive high pressure from the movement-restricting tapered face 35a. Additionally, the chuck 12C is less rigid and highly flexible in parts near the front slots 31 in the circumferential direction. For these reasons, in the circumferential direction of the chuck 12C, parts of the tapered face portion 62 and the tapered face portion 63 near the from slots 31 widely come into surface contact with the movement-restricting tapered face 35a, around the border between the tapered face portion 62 and the tapered face portion 63. In other words, when the chuck 12C holds the workpiece W, two tapered face portions 62, 63 in the middle in the axial direction and on the rear side of the front tapered face 21Ca simultaneously abut on the movement-restricting tapered face 35a.

Meanwhile, intermediate points between the front slots 31 adjacent in the circumferential direction of the front tapered face 21Ca are highly rigid and less flexible, and therefore are less likely to come into surface contact with the movement-restricting tapered face 35a, and come into an approximate linear contact with the movement-restricting tapered face 35a at the border between the tapered face portion 62 and the tapered face portion 63.

Figure 13:
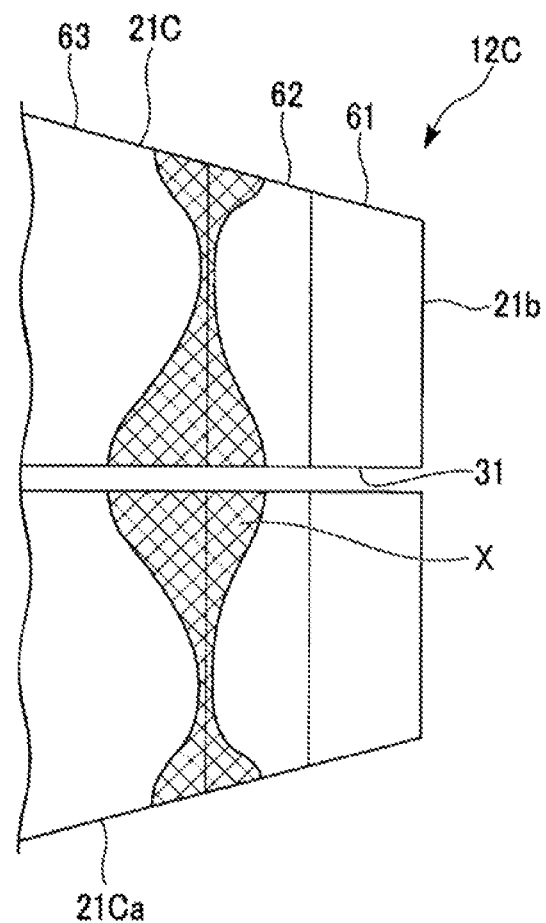
FIG. 13 is a partial side view illustrating the chuck of the chuck device of the fourth embodiment of the present invention, in which a contact area with a cap nut is indicated by double-hatched areas.

A shaded area X in FIG. 13 is an area where the front tapered face 21Ca of the chuck 12C comes into contact with the movement-restricting tapered face 35a when the workpiece W is held. As illustrated in FIG. 13, a part of the front tapered face 21Ca near the border between the tapered face portion 62 and the tapered face portion 63 and near the front slot 31 in the circumferential direction comes into wider surface contact with the movement-restricting tapered face 35a, than near the border between the tapered face portion 62 and the tapered face portion 63 around the center between the front slots 31 adjacent in the circumferential direction.

In other words, since the front tapered face 21Ca includes the tapered face portion 62 and the tapered face portion 63 that form different angles with their center axes, an area of surface contact with the movement-restricting tapered face 35a repeatedly increases and decreases in parts in the circumferential direction, that is, increases and decreases alternately in the circumferential direction. As a result, it is possible to further suppress bite of the front tapered tubular portion 21C of the chuck 12C to the restriction portion 35 of the cap nut 13 that often occurs when retracting the sleeve 14 to the rear side to release the hold.

In the chuck 12C the angle α1 between the tapered face portion 61 closest to the front of the front tapered face 21Ca and its center axis is larger than the angle γ between the movement-restricting tapered face 35a of the cap nut 13 and its center axis. Hence, it is possible to keep the chuck 12C from scarring the movement-restricting tapered face 35a of the cap nut 13 when moving the chuck 12C to the front side.

According to the chuck device 11C of the fourth embodiment, the front tapered face 21Ca comes into contact with the movement-restricting tapered face 35a at two tapered face portions 62, 63 that form different angles with their center axes. Hence, pressing force of the restriction portion 35 of the cap nut 13 on the chuck 12C can be averaged. This allows the chuck 12C to hold the workpiece W appropriately. The chuck 12C can also hold the workpiece W appropriately when holding only on the front side of the chuck 12C in the axial direction.

An area of the chuck 12C that comes into surface contact with the movement-restricting tapered face 35a repeatedly increases and decreases in parts in the circumferential direction. Hence, it is possible to suppress bite of the chuck 12 to the restriction portion 35 that often occurs when releasing the hold.

The angle α3 between the tapered face portion 63 and its center axis is smaller than the angle α2 between the tapered face portion 62 on the end side and its center axis. With this, the tapered face portion 63 can be brought into contact with the restriction portion 35 of the cap nut 13, after bringing the tapered face portion 62 on the end side into contact therewith. Accordingly, the front tapered face 21a comes into contact smoothly with the restriction portion 35 of the cap nut 13.

The front tapered face 21Ca includes the tapered face portion 61 that forms the angle α1 with its center axis larger than that of the tapered face portion 62, in a part closer to the end side than the tapered face portion 62. Hence, the tapered face portion 62 can be brought into contact with the restriction portion 35 of the cap nut 13, while suppressing contact of the tapered face portion 61 on the end side. This can suppress scarring on the restriction portion 35 of the cap nut 13.

Note that the ring 51 may be omitted from the chuck device 11C of the fourth embodiment.

As has been described, in the first to fourth embodiments, a part on the front side of the chucks 12, 12A, 12C in the axial direction is circumferentially evenly divided into quarters by the four front slots 31 formed therein, and a part on the rear side of the chucks 12, 12A, 12C in the axial direction is circumferentially evenly divided into quarters by the four rear slots 32 formed therein, as an example. However, a configuration may be adopted in which a part on the front side of the chuck in the axial direction may be circumferentially evenly divided into eight parts by eight front slots 31 formed therein, and a part on the rear side of the chuck in the axial direction is circumferentially evenly divided into eight parts by eight rear slots 32 formed therein. Note, however, that the spring back-force of the chuck itself is higher and the force by which the chucks 12, 12A, 12C separate in the axial direction from the restriction portion 35 is stronger in the quartered configuration. Hence, the quartered configuration, can more surely suppress bite of the chucks 12, 12A, 12C to the restriction portion 35 that often occurs when releasing the hold.

The embodiments described above include: a cylindrical chuck formed so that at least a part in the axial direction is circumferentially divided, and configured to hold a bar-like workpiece; a tubular outer cylinder covering the outer peripheral side of the chuck, and including, on one side in the axial direction, a restriction part configured to restrict axial movement of the chuck by abutting on a first contact part on the one side in the axial direction of the chuck; and a sleeve provided in an axially movable manner on the inner peripheral side of the outer cylinder, and axially driven so that a pressing part on the one side in the axial direction abuts on a second contact part on the other side in the axial direction of the chuck. A movement-restricting tapered face is formed in the restriction part of the outer cylinder. A pressing tapered face is formed in the pressing part of the sleeve. The chuck includes, in the first contact part on the one side in the axial direction, a first tapered face whose outer diameter reduces toward an end, and includes, in the second contact part on the other side in the axial direction, a second tapered face whose outer diameter reduces toward an end. The first tapered face and the second tapered face form the same angle with their center axes, or the first tapered face forms a smaller angle with its center axis than the second tapered face. Angles respectively formed between the movement-restricting tapered face, the pressing tapered face, and the second tapered face and their center axes are equivalent to each other. This can average the pressing force of the pressing part of the sleeve and the restriction part of the outer cylinder on the chuck. Hence, the chuck can bold the workpiece appropriately.

The embodiments include: a cylindrical chuck formed so that at least a part in the axial direction is circumferentially divided, and configured to hold a bar-like workpiece; a tubular outer cylinder covering the outer peripheral side of the chuck, and including, on one side in the axial direction, a restriction part configured to restrict axial movement of the chuck by abutting on a first contact part on the one side in the axial direction of the chuck; and a sleeve provided in an axially movable manner on the inner peripheral side of the outer cylinder, and axially driven so that a pressing part on the one side in the axial direction abuts on a second contact part on the other side in the axial direction of the chuck. A movement-restricting tapered face is formed in the restriction part of the outer cylinder. A pressing tapered face is formed in the pressing part of the sleeve. The chuck includes, in the first contact part on the one side in the axial direction, a first tapered face whose outer diameter reduces toward an end, and includes, in the second contact part on the other side in the axial direction, a second tapered face whose outer diameter reduces toward an end. The first tapered face includes at least two tapered face parts that form different angles with its center axis, and the two tapered face parts abut on the movement-restricting tapered face. This can average the pressing force of the restriction part of the outer cylinder on the chuck. Hence, the chuck can hold the workpiece appropriately. It is also possible to suppress bite of the chuck to the restriction part.

In the two tapered face parts, an angle between a second tapered face part on the other side and its center axis is smaller than an angle between a first tapered face part on an end side and its center axis. As a result, the second tapered face part on the other side can be brought into contact with the restriction part of the outer cylinder, after bringing the first tapered face part on the end side into contact therewith. Hence, the first tapered face comes into contact smoothly with the restriction part of the outer cylinder.

The first tapered face includes a third tapered face part that forms a larger angle with its center axis than the first tapered face part, in a part closer to the end than the first tapered face part. Hence, the first tapered face part can be brought into contact with the restriction part of the outer cylinder, while suppressing contact of the third tapered face part on the end side. This can suppress scarring on the restriction part of the outer cylinder.

According to a first aspect of the chuck device, provided is a chuck device including: a cylindrical chuck formed so that at least a part in the axial direction is circumferentially divided, and configured to hold a bar-like workpiece; a tubular outer cylinder covering the outer peripheral side of the chuck, and including, on one side in the axial direction, a restriction part configured to restrict axial movement of the chuck by abutting on a first contact part on the one side in the axial direction of the chuck; and a sleeve provided in an axially movable manner on the inner peripheral side of the outer cylinder, and axially driven so that a pressing part on the one side in the axial direction abuts on a second contact part on the other side in the axial direction of the chuck. A movement-restricting tapered face is formed in the restriction part of the outer cylinder, and a pressing tapered face is formed in the pressing part of the sleeve. The chuck includes, in the first contact part on the one side in the axial direction, a first tapered face whose outer diameter reduces toward an end, and includes, in the second contact part on the other side in the axial direction, a second tapered face whose outer diameter reduces toward an end. The first tapered face and the second tapered face form the same angle with their center axes, or the first tapered face forms a smaller angle with its center-axis than the second tapered face, and angles formed between the movement-restricting tapered face, the pressing tapered face, and the second tapered face and their center axes are equivalent to each other.

According to a second aspect of the chuck device, provided is a chuck device including: a cylindrical chuck formed so that at least a part in the axial direction is circumferentially divided, and configured to hold a bar-like workpiece; a tubular outer cylinder covering the outer peripheral side of the chuck, and including, on one side in the axial direction, a restriction part configured to restrict axial movement of the chuck by abutting on a first contact part on the one side in the axial direction of the chuck; and a sleeve provided in an axially movable manner on the inner peripheral side of the outer cylinder, and axially driven so that a pressing part on the one side in the axial direction abuts on a second contact part on the other side in the axial direction of the chuck. A movement-restricting tapered face is formed in the restriction part of the outer cylinder; and a pressing tapered face is formed in the pressing part of the sleeve. The chuck includes, in the first contact part on the one side in the axial direction, a first tapered face whose outer diameter reduces toward an end, and includes, in the second contact part on the other side in the axial direction, a second tapered face whose outer diameter reduces toward an end. The first tapered face includes at least two tapered face parts that form different angles with its center axis, and the two tapered face parts abut on the movement-restricting tapered face.

According to a third aspect of the chuck device, in the second aspect, an angle between a second tapered face part and its center axis is smaller than an angle between a first tapered face part on an end side and its center axis.

According to a fourth aspect of the chuck device, in the third aspect, the first tapered face includes a third tapered face part that forms a larger angle with its center axis than the first tapered face part, in a part closer to the end than the first tapered face part.

Although some embodiments of the present invention have been described, the above embodiments of the invention are provided to facilitate understanding of the invention, and are not intended to limit the invention. The invention may be modified or improved without departing from the spirits of the invention, and its equivalents are also included in the invention, as a matter of course. Components described in the claims and the specification may be arbitrarily combined or omitted within a scope capable of solving at least a part of the aforementioned problem, or a scope capable of achieving at least a part of the effects.

This application claims priority to Japanese Patent Application No. 2015-131111 filed on Jun. 30, 2015. The entirety of disclosures including the specification, the claims, the drawings, and the abstract of Japanese Patent Application No. 2015-131111 filed on Jun. 30,2015 are incorporated herein by reference.

REFERENCE SIGNS LIST

11, 11A, 11B, 11C chuck device, 12, 12A, 12C chuck, 13 cap nut (outer cylinder), 14 sleeve, 21, 21A, 21C front tapered tubular portion (first contact part), 21a, 21Aa, 21Ca front tapered face (first tapered face), 24 rear tapered tubular portion (second contact part), 24a rear tapered face (second tapered face), 35 restriction portion, 35a movement-restricting tapered face, 41 pressing portion, 41a pressing tapered face, 61 tapered face portion (third tapered face part), 62 tapered face portion (first tapered face part), 63 tapered face portion (second tapered face part), W workpiece

The invention claimed is:

1. A chuck device comprising:
a cylindrical chuck formed so that at least a part in an axial direction is circumferentially divided, including a first contact part on a first side in the axial direction and a second contact part on a second side opposite to the first side, and configured to hold a bar-like workpiece;
a tubular outer cylinder covering an outer peripheral side of the chuck, and including, on the first side, a restriction part configured to restrict axial movement of the chuck by abutting on the first contact part; and
a sleeve provided in an axially movable manner on an inner peripheral side of the outer cylinder, and including, on the first side, a pressing part axially driven to abut on the second contact part, wherein
a movement-restricting tapered face is formed in the restriction part of the outer cylinder,
a pressing tapered face is formed in the pressing part of the sleeve,
the chuck includes, in the first contact part, a first tapered face whose outer diameter reduces toward an end on the first side, and includes, in the second contact part, a second tapered face whose outer diameter reduces toward an end on the second side,
the first tapered face includes at least two tapered face parts,
angles respectively formed between the at least two tapered face parts and the center axis of the chuck are different from each other, and
each of the at least two tapered face parts abuts on the movement-restricting tapered face.

2. The chuck device according to claim 1, wherein
the at least two tapered face parts includes a first tapered face part and a second tapered face part positioned closer to the second side than the first tapered face part, and
an angle between the second tapered face part and the center axis is smaller than an angle between the first tapered face part and the center axis.

3. The chuck device according to claim 2, wherein
the first tapered face includes a third tapered face part closer to the first side than the first tapered face part, and
an angle between the third tapered face part and the center axis is larger than the angle between the first tapered face part and the center axis.

\* \* \* \* \*